United States Patent [19]

Owashi et al.

[11] Patent Number: 5,459,585
[45] Date of Patent: Oct. 17, 1995

[54] APPARATUS AND METHOD OF STORING IMAGE SIGNALS

[75] Inventors: Hitoaki Owashi, Yokohama; Toshiaki Kawamura, Mitaka; Yoshizumi Watatani, Fujisawa; Katsuo Mohri, Yokosuka; Michio Ozawa, Nakaminato; Hideo Arai, Chigasaki; Kyoichi Hosokawa, Yokohama; Kazutaka Naka, Yokohama; Fuzio Okamura, Yokohama, all of Japan

[73] Assignee: Hitachi, Ltd., Tokyo, Japan

[21] Appl. No.: 107,926

[22] Filed: Aug. 17, 1993

[30] Foreign Application Priority Data

Sep. 9, 1992 [JP] Japan ................................. 4-240331
Sep. 18, 1992 [JP] Japan ................................. 4-249177

[51] Int. Cl.$^6$ ................................................ H04N 1/40
[52] U.S. Cl. ........................... 358/444; 358/296; 348/426; 348/432; 348/439; 348/459
[58] Field of Search .............................. 358/444, 451, 358/296, 335, 342, 140, 141, 11; 348/426, 459, 437, 458, 459, 449, 398, 397, 437, 435, 438, 439

[56] References Cited

U.S. PATENT DOCUMENTS

| 3,803,352 | 4/1974 | Goldberger | 178/6.6 A |
|---|---|---|---|
| 4,139,869 | 2/1979 | Holt | 360/35 |
| 4,517,597 | 5/1985 | Glenn | 348/437 |
| 4,660,096 | 4/1987 | Arlan et al. | 358/310 |
| 4,794,447 | 12/1988 | Tsinberg | 348/437 |
| 4,939,586 | 8/1990 | Nabati et al. | 358/342 |
| 4,974,064 | 11/1990 | Tsinberg | 348/426 |
| 4,989,091 | 1/1991 | Lucas | 348/426 |
| 5,019,902 | 5/1991 | Yashki et al. | 348/397 |
| 5,029,002 | 7/1991 | Citta et al. | 348/437 |
| 5,109,451 | 4/1992 | Aono et al. | 348/397 |
| 5,128,750 | 7/1992 | Katagiri et al. | 358/12 |
| 5,128,791 | 7/1992 | LeGall et al. | 358/141 |
| 5,144,427 | 9/1992 | Kitaura et al. | 358/136 |
| 5,168,358 | 12/1992 | Ichizu et al. | 358/140 |
| 5,208,668 | 5/1993 | Dinsel et al. | 348/439 |
| 5,235,421 | 8/1993 | Yang | 348/398 |
| 5,307,171 | 4/1994 | Azuma et al. | 358/335 |
| 5,337,085 | 8/1994 | Lee et al. | 348/417 |
| 5,367,334 | 11/1994 | Nishino et al. | 348/705 |
| 5,387,939 | 2/1995 | Naimpally | 348/437 |

FOREIGN PATENT DOCUMENTS

| 0148970 | 6/1991 | Japan . |
|---|---|---|
| 4-107013 | 4/1992 | Japan . |
| 4-137823 | 5/1992 | Japan . |
| 4-170879 | 6/1992 | Japan . |

Primary Examiner—Edward L. Coles, Sr.
Assistant Examiner—Madeleine Nguyen
Attorney, Agent, or Firm—Fay, Sharpe, Beall, Fagan, Minnich & McKee

[57] ABSTRACT

An apparatus for storing high definition image signals capable of processing high definition image signals and low definition image signals using the same apparatus. A storage medium is provided with an interface of low definition image signals. High definition image signals are compressed, transformed into a format according to the specifications of the interface of low definition image signals and are then stored in the storage medium. The compressed image signals taken out from the storage medium are subjected to the format reverse transform for expansion to restore the original high definition image signals. The format-transformed compressed high definition image signals and the compressed high definition image signals taken out from the storage medium are transmitted over a transmission medium via low definition image interface and are, as required, stored in the storage medium or put to other processings, and are then expanded to restore the original high definition image signals.

10 Claims, 9 Drawing Sheets

| WORD | 1 | | | | | | | | 2 | | | | | | | | 3 | | | | | | | | 4 | | | | | | | | 5 | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| BIT | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 |
| INPUT DATA | 0 | 1 | 0 | 1 | 1 | 1 | 1 | 0 | 0 | 0 | 0 | 0 | 0 | 0 | 1 | 1 | 0 | 0 | 0 | 0 | 0 | 1 | 0 | 0 | 0 | 0 | 0 | 0 | 1 | 1 | 0 | 1 | 0 | 0 | 0 | 0 | 0 | 0 | 0 | 0 |

| SHIFT DATA      | 0 | 1 | 0 | 1 | 1 | 1 | 1 | 0 | 0 | 0 | 0 | 0 | 0 | 0 | 1 | 1 | 0 | 0 | 0 | 0 | 0 | 0 | 1 | 0 | 0 | 0 | 0 | 0 | 1 | 1 | 1 | 0 | 1 | 0 | 0 | 0 | 0 | 0 | 0 | 0 |
| TRANSFORMED DATA| 0 | 1 | 0 | 1 | 1 | 1 | 1 | 0 | 0 | 0 | 0 | 0 | 0 | 0 | 1 | 1 | 0 | 0 | 0 | 0 | 0 | 0 | 1 | 0 | 0 | 0 | 0 | 0 | 1 | 1 | 1 | 0 | 1 | 0 | 0 | 0 | 0 | 0 | 0 | 0 |

FIG. 10

| WORD | 1 | | | | | | | | 2 | | | | | | | | 3 | | | | | | | | 4 | | | | | | | | 5 | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| BIT | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 |
| INPUT DATA | 0 | 1 | 0 | 1 | 1 | 1 | 1 | 0 | 0 | 0 | 0 | 0 | 0 | 0 | 1 | 1 | 0 | 0 | 0 | 1 | 0 | 0 | 1 | 0 | 0 | 0 | 0 | 0 | 1 | 1 | 1 | 0 | 1 | 0 | 0 | 0 | 0 | 0 | 0 | 0 |

| RECONSTRUCTED DATA | 0 | 1 | 0 | 1 | 1 | 1 | 1 | 0 | 0 | 0 | 0 | 0 | 0 | 0 | 1 | 1 | 0 | 0 | 0 | 0 | 0 | 0 | 0 | 0 | 0 | 0 | 0 | 0 | 1 | 1 | 0 | 1 | 0 | 0 | 0 | 0 | 0 | 0 | 0 | 1 |

| WORD | 1 | | | | | | | | 2 | | | | | | | | 3 | | | | | | | | 4 | | | | | | | | 5 | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| BIT | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| INPUT DATA | 0 | 1 | 0 | 1 | 1 | 1 | 1 | 0 | 0 | 0 | 0 | 0 | 0 | 0 | 0 | 0 | 0 | 0 | 0 | 0 | 1 | 0 | 1 | 0 | 1 | 1 | 1 | 1 | 1 | 1 | 1 | 0 | 0 | 0 | 0 | 0 | 0 | 0 | 0 | 1 |
| SHIFT DATA | 0 | 1 | 0 | 1 | 1 | 1 | 1 | 0 | 0 | 0 | 0 | 0 | 0 | 0 | 0 | 0 | 0 | 0 | 0 | 0 | 1 | 0 | 1 | 0 | 1 | 1 | 1 | 1 | 1 | 1 | 1 | 1 | 1 | 0 | 0 | 0 | 0 | 0 | 0 | 0 |
| TRANSFORMED DATA | 0 | 1 | 0 | 1 | 1 | 1 | 1 | 0 | 0 | 0 | 0 | 0 | 0 | 0 | 0 | 0 | 0 | 0 | 0 | 0 | 1 | 0 | 1 | 0 | 1 | 1 | 1 | 1 | 1 | 1 | 1 | 0 | 1 | 0 | 0 | 0 | 0 | 0 | 0 | 0 |

FIG. 14

| WORD | 1 | | | | | | | | 2 | | | | | | | | 3 | | | | | | | | 4 | | | | | | | | 5 | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| BIT | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| INPUT DATA | 0 | 1 | 1 | 1 | 1 | 0 | 1 | 0 | 0 | 1 | 1 | 0 | 0 | 0 | 0 | 0 | 0 | 0 | 1 | 0 | 0 | 0 | 0 | 0 | 1 | 0 | 1 | 1 | 1 | 0 | 0 | 1 | 0 | 1 | 0 | 0 | 0 | 0 | 0 | 0 |
| SHIFT DATA | 0 | 1 | 1 | 1 | 1 | 0 | 1 | 0 | 0 | 1 | 1 | 0 | 0 | 0 | 0 | 0 | 0 | 0 | 1 | 0 | 0 | 0 | 0 | 0 | 0 | 1 | 0 | 1 | 1 | 1 | 0 | 0 | 1 | 0 | 1 | 0 | 0 | 0 | 0 | 0 |
| TRANSFORMED DATA | 0 | 1 | 1 | 1 | 1 | 0 | 1 | 0 | 0 | 1 | 1 | 0 | 0 | 0 | 0 | 0 | 0 | 0 | 1 | 0 | 0 | 0 | 0 | 1 | 0 | 1 | 0 | 1 | 1 | 1 | 0 | 0 | 1 | 0 | 1 | 0 | 0 | 0 | 0 | 0 |

APPARATUS AND METHOD OF STORING IMAGE SIGNALS

BACKGROUND OF THE INVENTION

1. Field of the Invention

The present invention relates to an apparatus for storing image signals, and more particularly to an apparatus and a method of storing image signals suited for storing high definition image signals and for effectively utilizing an interface and a transmission medium of low definition image signals. The invention is further related to a data transform method and apparatus which are adapted to the cases where it is not allowed to transmit particular signal levels.

2. Background Art

An apparatus for compressing image signals has been disclosed in, for example, Japanese Patent Laid-Open No. 107013/1992. Apparatuses that compress image signals and then regenerate for magnetic recording have also been disclosed in Japanese Patent Laid-Open Nos. 137823/1992 and 170879/1992.

The above prior arts teach technology for compressing image signals so that they can be transmitted over a predetermined transmission medium and technology related to an apparatus that records image signals by compressing them. Nothing, however, is disclosed in relation to technology for effectively utilizing interfaces and transmission medium of low definition image signals.

In a digital signal processing circuit for transmitting image signals, an 8-bit word is usually treated as a unit. In a digital VTR of D-2 format, for instance, the ordinary TV signals are sampled with a frequency four times as great as that of a color sub-carrier wave, and the sampled values are recorded as 8-bit binary data.

However, in the case of a digital image apparatus as represented by a digital VTR of D-2 format, it has been standardized not to use 00(H) or FF(H) (H indicates hexadecimal notation). With the D-2 VTR, 00(H) has a value far smaller than a sync tip and does not almost appear as an image signal. Therefore, the D-2 VTR is almost not affected even when 00(H) is replaced by 01(H). Similarly, FF(H) is larger than a value of an ordinary image signal and scarcely appear as an image signal. Therefore, the VTL is not quite affected even when FF(H) is replaced by FE(H).

However, when it is attempted to transmit a digital data instead of an image signal, even 00(H) and FF(H) which have the same meanings as other data are not allowed to be replaced by other data. Moreover, an apparatus that handles image signals effects the processing with a synchronizing signal as a reference. When values smaller than a predetermined value are continuously generated, therefore such values are treated as synchronizing signals. Therefore, the general digital data could not be transmitted over a transmission medium of transmitting image signals.

SUMMARY OF THE INVENTION

It is an object of the present invention to provide an apparatus and a method of storing high definition image signals, which make it possible to use an apparatus for low definition image signals for the processing of high definition image signals.

It is a second object of the present invention to provide an apparatus and a method of storing high definition image signals, that make it possible to transmit high definition image signals by using a transmission medium for low definition image signals.

It is a third object of the present invention to provide a method and an apparatus for transforming data, capable of efficiently transmitting digital data without any problem even when use of 00(H) and FE(H) has been inhibited by standards or even when continuation of values smaller than a predetermined value has been inhibited.

In order to achieve the above first and second objects, the present invention comprises providing a storage medium with an interface of low definition image signals, compressing high definition image signals, transforming the format according to the specifications of interface of low definition image signals and storing the image signals in the storage medium. The compressed image signals taken out from the storage medium are subjected to the reverse format transform, and are expanded to reconstruct the original high definition image signals. The format transform is further effected, and the compressed high definition image signals as well as the compressed high definition image signals taken out from the storage medium are transmitted over transmission medium via a low definition interface, subjected to other processings, and are expanded to reconstruct the original high definition image signals.

Compression of the high definition image signals makes it possible to accomplish a data rate equivalent to that of the low definition image signals. The compressed high definition image signals that are format-transformed into the specifications of low definition interface can then be processed in the same manner as the low definition image signals, permitting the use of an interface of low definition image signals, and can then be stored in the storage medium for low definition image signals. The compressed image signals taken out from the storage medium have been format-transformed in compliance with the specifications of interface of low definition image signals prior to being stored and, hence, permit the use of the interface of low definition image signals. The high definition signals output via the interface can be expanded and reconstructed as the original high definition image signals.

Moreover, since the compressed image signals have been format-transformed in compliance with the specifications of the low definition interface, it is allowed to transmit the compressed high definition image signals by using a transmission medium connected to the interface. Therefore, the signals can be processed through other signal processing circuits connected to the transmission medium, can be stored in a storage medium, and can be expanded to restore the original high definition image signals.

According to the present invention, furthermore, an apparatus for low definition image signals is used for the processing of high definition image signals, making it possible to decrease the cost of the system. Moreover, the apparatus of a reduced size can be used with ease.

In order to achieve the above third object under the condition where use of 00(H) and FF(H) is inhibited, the data bits of an input word are checked. When the checked seven bits are all 0 or 1, the bit following the seven bits is shifted by one, and 1 or 0 is added to a portion that is created by the shifting in order to obtain transformed data. The bits corresponding to the bits checked at the time of transforming the data of an input word are checked when the data are restored. When the seven bits are all 0 or 1, the eighth bit is deleted and a subsequent bit is shifted forward by one. When the seven bits are all 0 or 1, 1 or 0 is added to delete 00(H) or FF(H). When the seven bits are all 0 or 1 at the restoration of compressed data, then it is obvious that the subsequent bit is the one that was added at the time of transforming the data. Therefore, this bit can be deleted. The bits which follows the deleted bit are shifted forward to obtain consecutive bits; i.e., the whole data are restored in the original state of input data.

DETAILED DESCRIPTION

Figure 1:
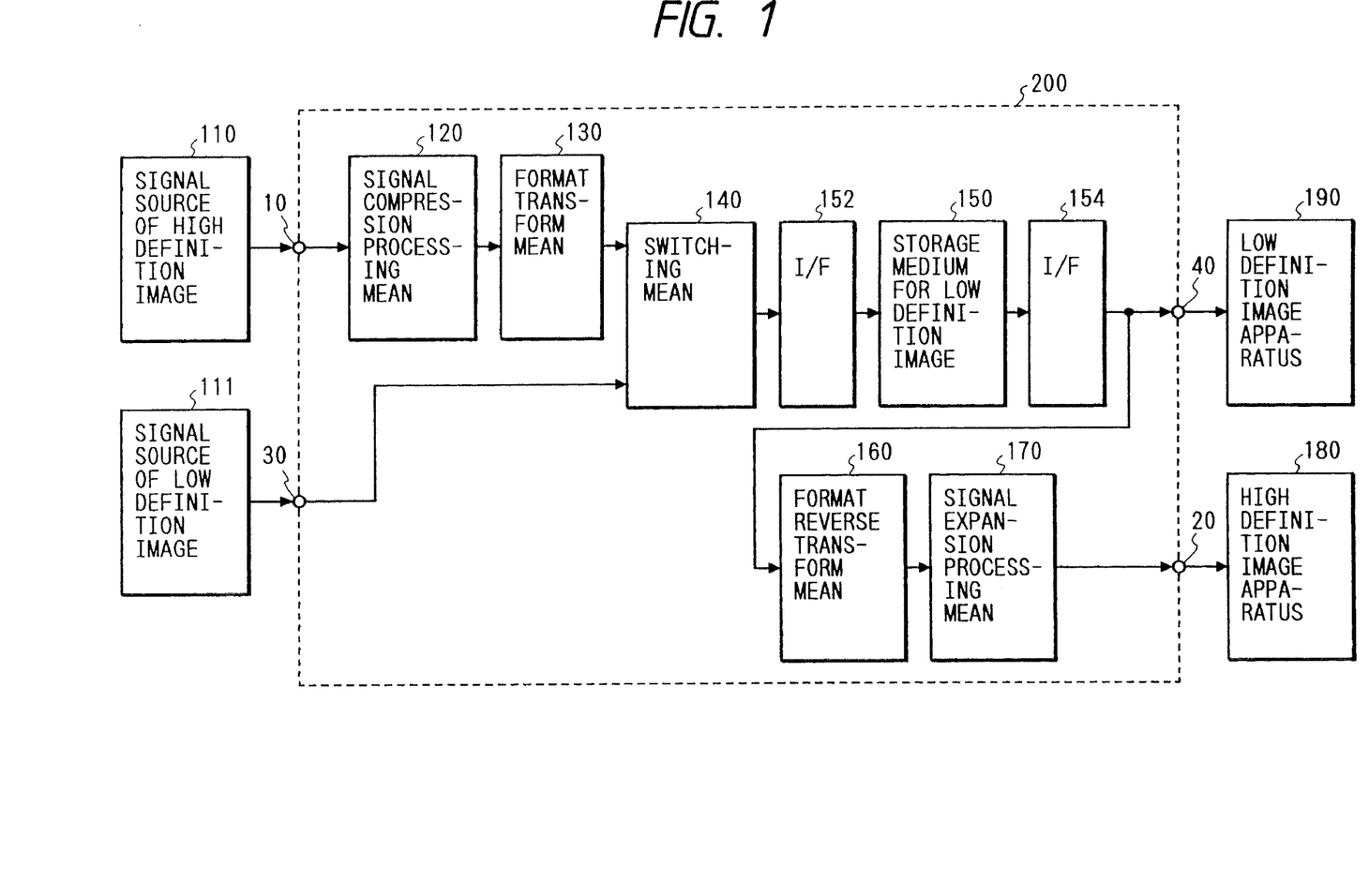
FIG. 1 is a block diagram illustrating a first embodiment of the present invention.

An embodiment of the invention will now be described with, reference to FIG. 1. This embodiment deals with the case where the invention is adapted to a storage medium for storing image signals. In FIG. 1, reference numeral 10 denotes an input terminal for high definition image signals, 20 denotes an output terminal of high definition image signals, 30 an input terminal of low definition image signals, 40 an output terminal of low definition image signals, 110 a source of high definition image signals, 111 a signal source of low definition image, 120 a signal compression processing means, 130 a format transform means, 140 a switching means, 150 a storage medium for low definition image, 152 and 154 denote input and output interfaces, 160 a format reverse transform means, 170 a signal expansion processing means, 180 a high definition image apparatus, 190 a low definition image apparatus, and reference numeral 200 denotes a storage medium for compressed signals.

The signal source 110 of high definition image is, for example, a high definition TV camera and its output is connected to the storage medium 200 for compressed signals via terminal 10. The signal source 111 of low definition image is, for example, an ordinary TV camera and its output is connected to the storage medium 200 for compressed signals via terminal 30.

The storage medium 200 for compressed signals includes the signal compressed processing means 120 which compresses the high definition image signals that are input through the terminal 10. The signal compression processing means compresses the high definition image signals such that the amount thereof is smaller than the amount of effective image data of low definition image signals that are input through the terminal 30 in compliance with a system determined, for example, by the JPEG (Joint Photographic Cording Expert Group).

The output of the signal compression processing means 120 is input to the format transform means 130 which effects the format transform processing so as to come into agreement with the input format of the low definition image signals that are input through the terminal 30. The signal compression processing means 120 compresses the high definition image signals so that the output data rate after the format transform through the format transform means 130 is in agreement with the data rate of low definition image signals that are input through the terminal 30.

The low definition image signal input through the terminal 30 and the output signal of the format transform means 130 are input to the switching means 140 which selects and outputs the low definition image signal input through the terminal 30 when the low definition image signal is to be stored in the storage medium 150 for low definition image, and selects and outputs the output signal of the format transform means 130 when the high definition image signal is to be stored.

The output signal of the switching means 140 is input to the storage medium 150 for low definition image via an input interface 152. When the image signals from the source 111 of low definition image signals are stored, the signals are taken out from the storage medium 150 for low definition image and are input to the low definition image apparatus 190 via output interface 154 and terminal 40. The low definition image apparatus 190 is, for example, a monitor TV that corresponds to the source 111 of low definition image signals.

To take out the compressed high definition image signals from the storage medium 150 for low definition image, the signals are output via the output interface 154 and terminal 40, and are input to the format reverse transform means 160 which produces the compressed original high definition image signal in correspondence to the format transform means 130. The compressed high definition image signals output from the format reverse transform means 160 are input to the signal expansion processing means 170.

The signal expansion processing means 170 restores the original high definition image signals in correspondence to the signal compression processing means 120. The output signal of the signal expansion processing means 170 is output as an output signal of the storage medium 200 for compressed signals via terminal 20, and are input to the high definition image apparatus 180 which is, for example, a monitor TV that corresponds to the source 110 of high definition image signals.

The compressed high definition image signals taken out from the storage medium 150 for low definition image via terminal 40 are, as required, input to the low definition image apparatus 190.

According to the embodiment shown in FIG. 1, the high definition image signals can be stored in the storage medium for low definition image, and the low definition image signals can be stored without being compressed. Moreover, it is allowed to take out the low definition image signals from the storage medium for low definition image as well as to take out the compressed high definition image signals therefrom. Furthermore, the compressed image signals can be taken out by restoration into the original high definition image signals. This makes it possible to use in common many of the devices for high definition image signals and many of the devices for low definition image signals.

Figure 2:
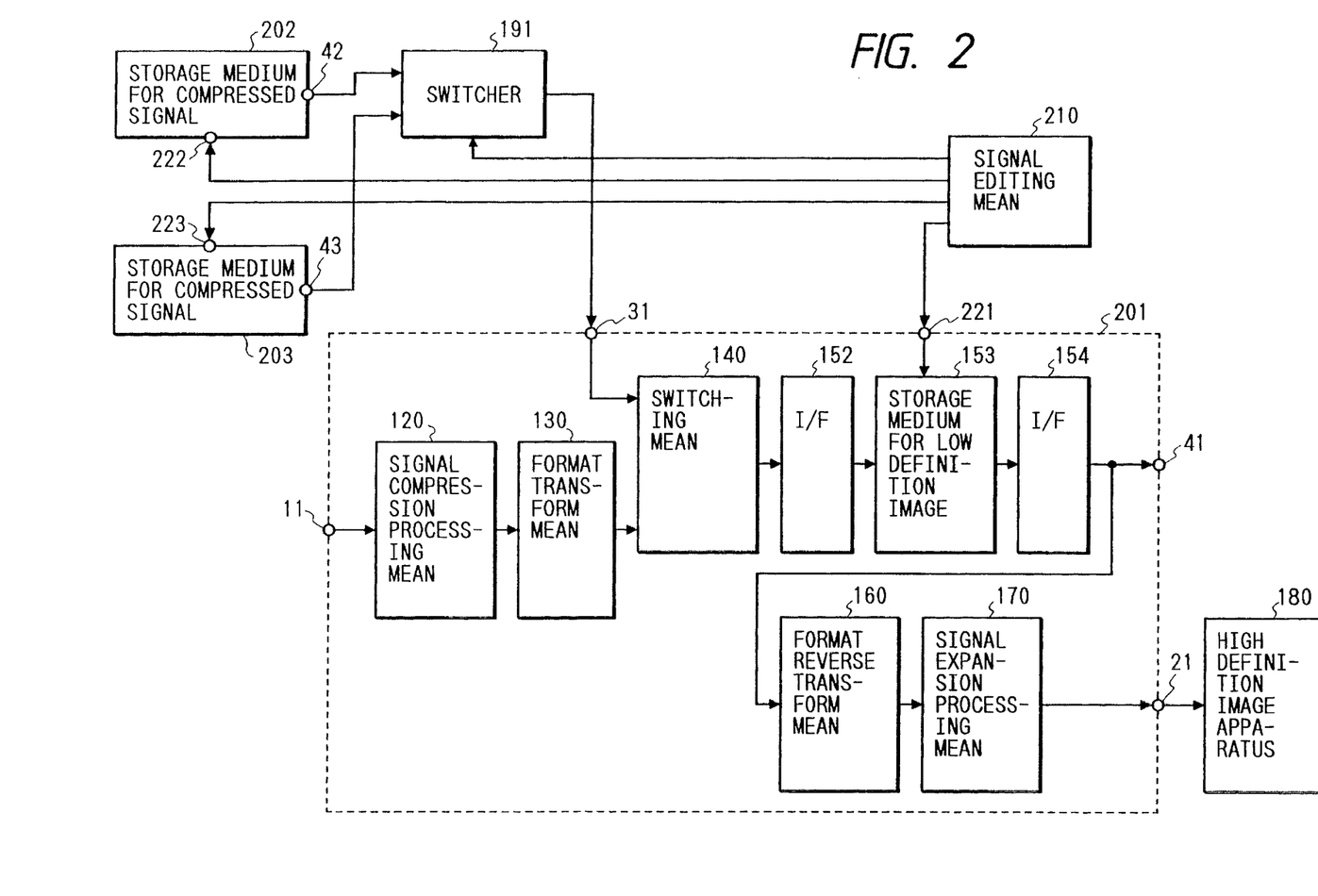
FIG. 2 is a block diagram illustrating a second embodiment of the present invention.

Next, FIG. 2 illustrates an embodiment in which the compressed high definition image signals are stored in the storage medium for low definition image and the low definition image apparatus is connected to the output that corresponds to the terminal 40 of FIG. 1. In FIG. 2, those portions that are the same as those of the embodiment of FIG. 1 are denoted by the same reference numerals and their description is not repeated here.

In FIG. 2, reference numeral 11 denotes an input terminal of high definition image signals, 21 denotes an output terminal of high definition image signals, 31 an input terminal of low definition image signals, 41 to 43 denote output terminals of low definition image signals, 152 and 154 denote input and output interfaces, 153 a storage medium for low definition image, 191 a switcher, 201 to 203 denote storage media for compressed signals, 210 a signal editing means, and reference numerals 221 to 223 denote input terminals of edit control signals.

The storage media 201 to 203 for compressed signals are constituted in the same manner as the storage medium for compressed signals shown in FIG. 1. However, since this embodiment deals with the case of editing signals, the diagram depicts particularly the input terminals 221 to 223 that receive control signals from the signal editing means 210.

The compressed high definition image signals are taken out from the storage media 202 and 203 for compressed signals via terminals 42 and 43, and are input to the switcher 191 which may be the one for low definition image signals. This corresponds to the embodiment shown in FIG. 1 in which the compressed high definition image signals output from the terminal 40 are connected to the low definition image apparatus.

Control signals are input from the signal editing means 210 to the storage media 202 and 203 for compressed signals via terminals 222 and 223, and to the switcher 191. Described below is a case where the signals stored in the storage medium 203 for compressed signals are taken out following the signals that are stored in the storage medium 202 for compressed signals, and are stored in the storage medium 201 for compressed signals. Control signals such as time codes are input from the signal editing means 210 to the storage media 202 and 203 for compressed signals, and signals are taken out in synchronism from the storage media 202 and 203 for compressed signals, and output signals from the storage medium 202 for compressed signals are switched into signals from the storage medium 203 for compressed signals by the switcher 191 in response to predetermined time codes.

The compressed high definition image signals from the switcher 191 are input to the switching means 140 through the terminal 31 of the storage medium 201 for compressed signals. In this case, the switching means 140 selects the output signal of the terminal 31. The output signal of the switching means 140 is stored in the storage medium 153 for low definition image via an interface 152. As required, at this moment, the storage medium 153 for low definition image receives a control signal from the signal editing means 210 via a terminal 221. The signal is then taken into a predetermined position in the storage medium 153 depending upon a control signal such as a time code input from the terminal 221.

The operation for taking out the compressed image signal from the storage medium 153 for low definition image is the same as that of the embodiment shown in FIG. 1.

According to this embodiment, the high definition image signals can be processed by using a low definition image apparatus. That is, a small low definition image apparatus that is easy to use can be employed to substitute for a high definition image apparatus that tends to become bulky, making it easy to use the apparatus.

Figure 3:
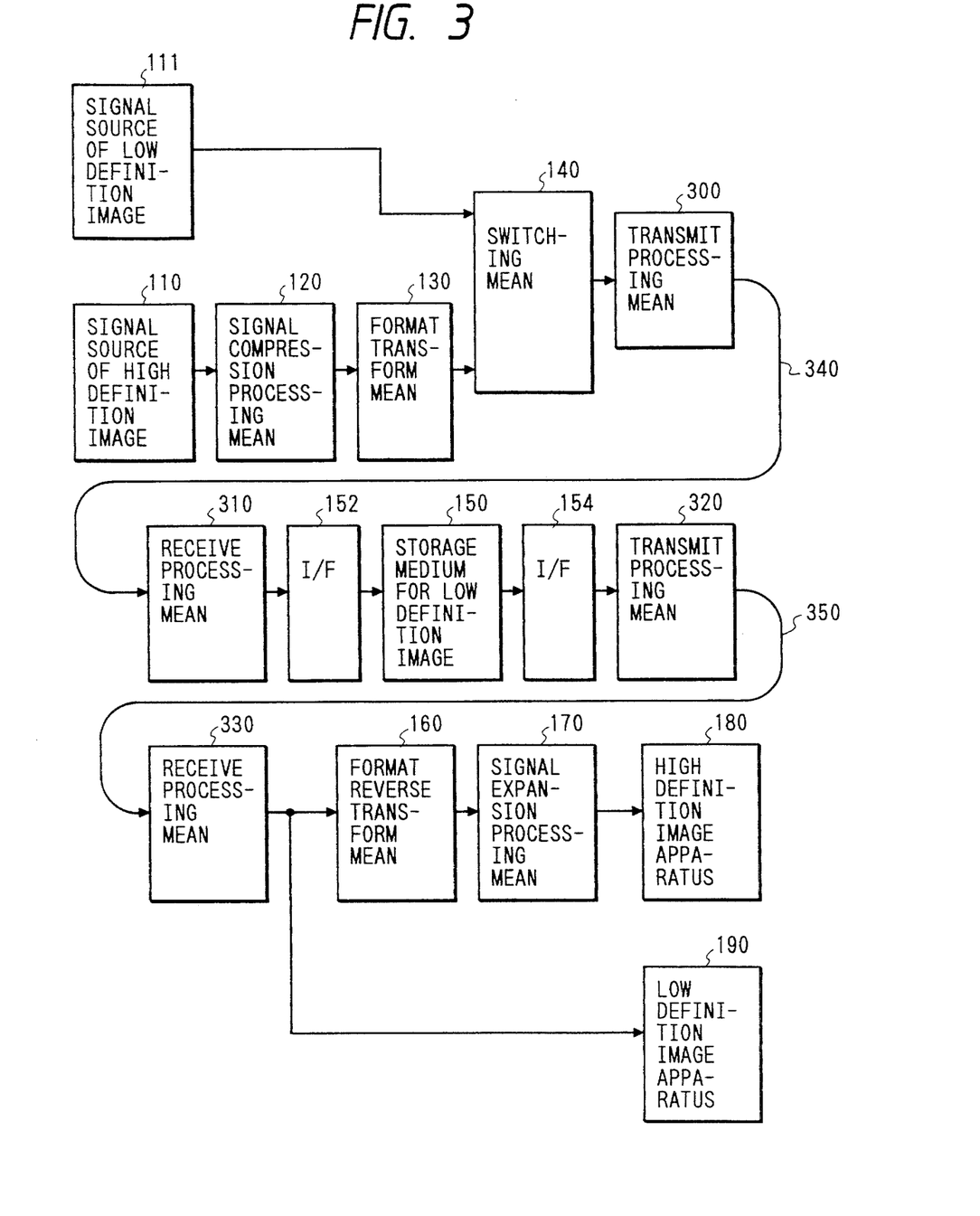
FIG. 3 is a block diagram illustrating a third embodiment of the present invention.

FIG. 3 illustrates an embodiment of the present invention in which the storage medium for low definition image, the signal compression processing means, and the signal expansion processing means are installed at remote places. In FIG. 3, some portions are constituted in the same manner as in FIG. 1 and are denoted by the same reference numerals, but their description is not repeated. In FIG. 3, reference numerals 300 and 320 denote transmit processing means, 310 and 330 denote receive processing means, and 340 and 350 denote transmission media.

Like in the embodiment shown in FIG. 1, the low definition image signals or the compressed high definition image signals are output from the switching means 140. The output signal of the switching means 140 is input to the transmit processing means 300. The transmit signal processing means is, for example, a signal processing means which transforms the image signals so that they can be transmitted as serial data over one coaxial line. Though not particularly diagramed in the embodiment shown in FIG. 3, even the voice signals can be transmitted, as required, in a multiplexed manner. For instance, there can be used a serial interface standard called SMPTE 259M.

The image signals are transmitted over the transmission medium 340 and are input to the receive processing means 310. When the above-mentioned SMPTE 259M serial interface standard is used, the serial data are restored into the original parallel signals and are stored in the storage medium 150 for low definition image via the input interface 152.

The image signals taken out from the storage medium 150 via the output interface 154 are transformed into serial data through the transmit processing means 320 like through the transmit processing means 300, and are transmitted over the transmission medium 350 which consists of a coaxial line. The transmitted data are restored through the receive processing means 330 into the original parallel signals, and are input to the format reverse transform means 160 and to the low definition image apparatus 190 like in the embodiment of FIG. 1.

According to this embodiment, the high definition image signals can be transmitted by using the trans,it processing means, transmission medium and receive processing means for low definition image signals. Therefore, there is no need of newly providing a transmit processing means, transmission medium or receive processing means for high definition image signals, and the cost of the system can be decreased.

Though the above embodiment did not particularly describe in detail the storage medium for low definition image, it should be noted that the storage medium for low definition image may that the storage medium for low definition image may be a digital magnetic recording-reproducing apparatus, a digital IC memory, a magnetic hard disc, or a magnetooptical disc.

Here, the words high definition and low definition are simply to compare the amounts of data but are not to mean the grade of picture quality. In the aforementioned embodiments, therefore, the high definition image signal stands for a signal having an amount of data greater than that of the low definition image signal.

In the embodiments, furthermore, the input image signals were described while presuming moving images. The signals, however, may be either a static picture or a moving picture without departing from the gist of the present invention.

According to the present invention, the high definition image signals are compressed and are transformed into a format of low definition image signals, making it possible to store the high definition image signals in the storage medium for low definition image. It is further allowable to process the compressed image signals taken out from the storage medium for low definition image using the low definition image apparatus.

Moreover, since the storage medium for compressed signals is provided with low definition image signal input/output terminals, it is allowed to store and retrieve the low definition image signals.

According to the present invention, furthermore, the high definition image signals are compressed, transformed into a format of low definition image signals and are transmitted. Therefore, it is allowed to transmit the high definition image signals by using a transmission medium for low definition image signals.

The present invention therefore makes it possible to process the high definition image signals by using the apparatus for low definition image signals, contributing to decreasing the cost of the system and, further, permitting the use of a small apparatus that can be easily manipulated.

A further embodiment of the present invention will now be described with reference to FIG. 4. This embodiment deals with the case where the invention is adapted to a system which inputs high-definition television signals of a wide band, compresses them and records them into a VTR of the ordinary TV system.

Figure 4:
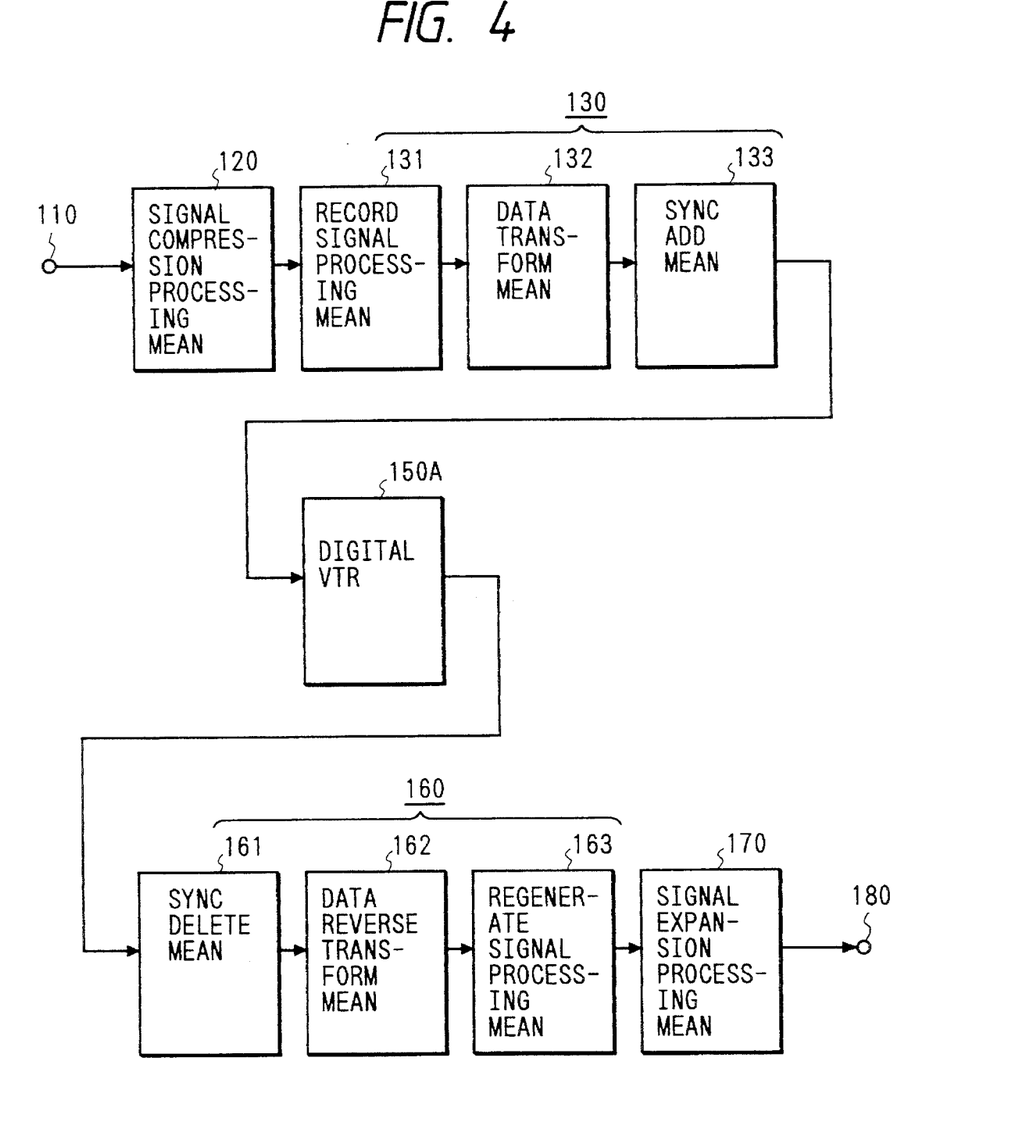
FIG. 4 is a block diagram illustrating a fourth embodiment of the present invention.

In FIG. 4, reference numeral 110 denotes an input terminal of high-definition television signals, 120 the signal compression processing means, 130 the format transform means, 131 a record signal processing means, 132 a data transform means, 133 a sync add means, 150A a digital VTR which works as a storage medium for low definition image, 160 the format reverse transform means, 161 a sync delete means, 162 a data reverse transform means, and 163 denotes a regenerate signal processing means. Reference numeral 170 denotes the signal expansion processing means, and 180 denotes an output terminal of regenerated high-definition television signals. Here, the same portions as those of FIG. 1 are denoted by the same reference numerals.

Digitized high-definition television signals input through the input terminal 110 are fed to the signal compression processing means 120 where they are subjected to the discrete cosine transform (DCT) as specified under, for example, JPEG standards to form variable length codes which are then compressed. The compressed signals are input to the record signal processing means 131 where they are rearranged so as to be adapted to being recorded in the digital VTR 150A. The data after the record processing are input to the data transform means 132.

Figure 5:
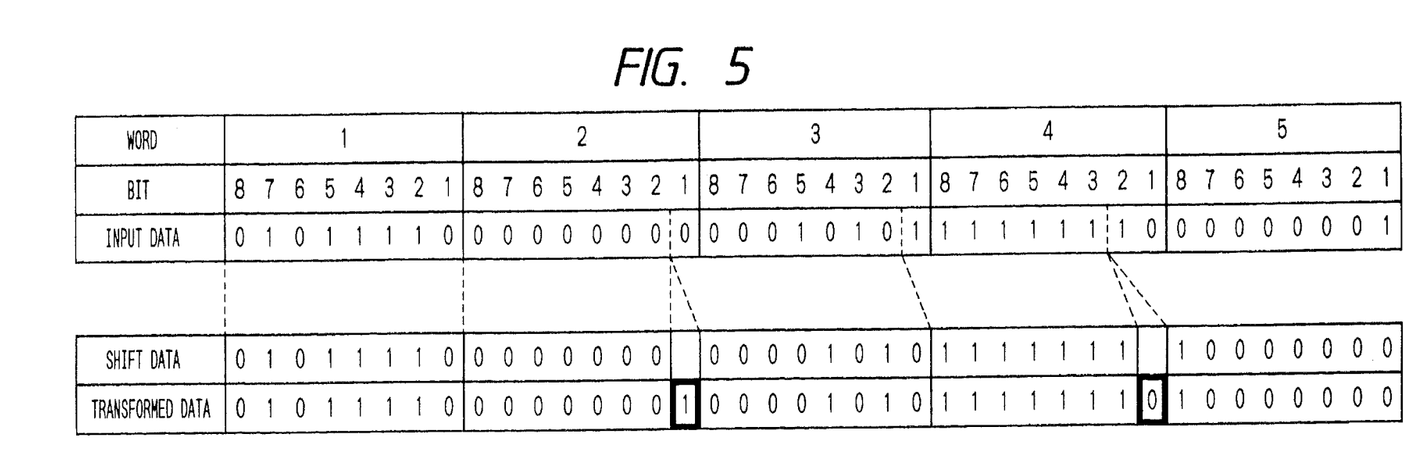
FIG. 5 is a diagram for explaining the operation of the embodiment of FIG. 4.

FIG. 5 is a diagram for explaining the operation of the data transform means 132 of FIG. 4, and illustrates a transform method in the case when the data 00(H) and FF(H) are inhibited. The input data to the data transform means 132 are sectionalized for every eight bits and are checked word by word to determine whether they are inhibit data. In the embodiment shown in FIG. 5, the data are transmitted from the MSB.

In FIG. 5, when the data are checked from the MSB side of the word 1, it will be learned at the bit 7 that the data is neither 00(H) nor FF(H). In this case, the data are transmitted in their own form. That is, the shift data and transformed data shown in FIG. 5 become equal to the input data. Next, the data are checked from the MSB side of the word 2. Here, it is not yet known at the bit 2 whether the data is 00(H) or not. In this case, the data following the bit 1 are all shifted by one bit as in the shift data shown in FIG. 5. The transformed data is obtained by adding data 1 to the bit 1. The example of FIG. 5 has dealt with the case where the input data that follows the bit 2 of word 2 is 0. Even in the case when the input data is 1, 1 is added as a transformed data in the same manner as above. This is to clarify at the time of regeneration that 1 was added during the data transform for reconstructing the original data.

Then, the word 3 of the shift data is checked. This corresponds to the data of from bit 1 of the word 2 of input data to the bit 2 of the word 3. Since the bit 4 of the word 3 of shift data is 1, it clear that the data is neither 00(H) or FF(H). In this case, the word 3 of the shift data is directly output as transformed data.

In the word 4 of the shift data, the input data has been shifted already by one bit. In this case, however, it is not yet know at the bit 2 (bit 3 of input data) whether the data is FF(H) or not. In this case, the data following the bit 2 in the word 4 of input data are further shifted by one bit. That is, the shift data have a blank at the bit 1 of the word 4. The transformed data is obtained by adding data 0 to the blank portion of the shift data. Thus, the data are shifted by a total of two bits with respect to the input data. Even in this case, the data is 1 that follows the bit 3 of the word 4 of the input data. Even when the above data is 0, however, the data 0 is added in the same manner. This is to clarify at the time of regeneration that 0 was added during the data transform for reconstructing the original data.

Checking is hereinafter carried out in the same manner. When it is not yet known at the bit 2 of the shift data whether that the data is neither 00(H) nor FF(H), the input data are shifted by one bit, and the data 1 and 0 are added to blank portions that are formed by the shift.

Referring to FIG. 4, the data transform processing shown in FIG. 5 is executed by the date transform means 132, and the data are then input to the sync add means 133 where a synchronizing signal and a burst signal are added to the data, and the data are arranged to be in agreement with the digital input/output format of the digital VTR 150A and are then input to the digital VTR 150A. The input data are recorded in the digital VTR 150A.

The signals regenerated by the digital VTR 150A are input to the sync delete means 161 in the format reverse transform means 160, so that the synchronizing signals and burst signals other than the data are removed. The data signals are then input to the data reverse transform means 162 which deletes the data added to the bit 1 by the data transform means 132.

Figure 6:
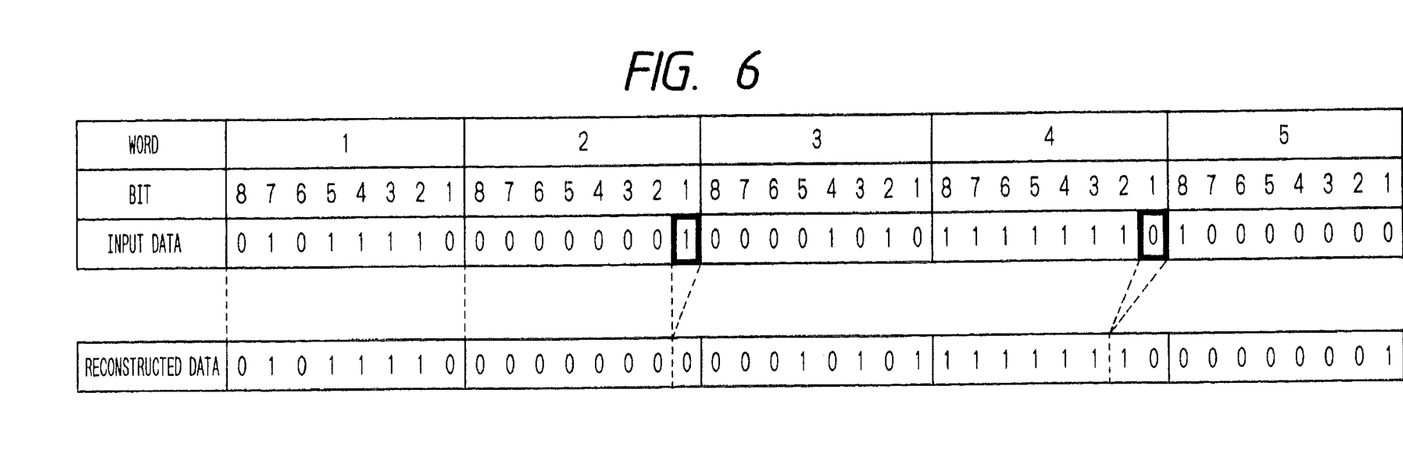
FIG. 6 is a diagram for explaining the operation of the embodiment of FIG. 4.

FIG. 6 is a diagram for explaining the operation thereof. The input data are checked word by word. When 01(H) or FE(H) is detected, the bit 1 is deleted, and the subsequent data are shifted forward by one bit to restore data. In an example of FIG. 6, the input data of word 2 is 01(H).

Therefore, the data 1 of the bit 1 is deleted, and the subsequent bits are shifted forward by one bit to restore data. Moreover, the word 4 of input data is FE(H) and the data 0 of bit 1 is deleted, and the subsequent data are further shifted forward by one bit to restore data. Thus, the data are shifted by a total of two bus up to the word 4. The processing is hereinafter carried out in the same manner, and the restored data shown in FIG. 6 become equal to the input data shown in FIG. 5.

Referring to FIG. 4, the data returned to the original data through the data reverse transform means 162 are input to the regenerate signal processing means 163 where the data are rearranged in correspondence to the record signal processing means 131 to obtain the original compressed data that correspond to the output signals from the signal compression processing means 120. The data returned to the original compressed data by the regenerate signal processing means 163 are input to the signal expansion processing means 170 where the data are expanded to restore the original high-definition television signals. The restored signals are output from the terminal 180.

As described above, the data can be recorded in and regenerated from the digital VTR without using the inhibited data of 00(H) or FE(H). If the probability of data of 00(H), 01(H), FE(H) and FF(H) is equal to the probability of data of 02(H) to FD(H), then, the increase is merely 4/256 bits per average word from the data transform systems of FIGS. 5 and 6. Therefore, the increment can be absorbed by the variable length encoding by the signal compression processing means 120, and there does not arise any problem.

Figure 7:
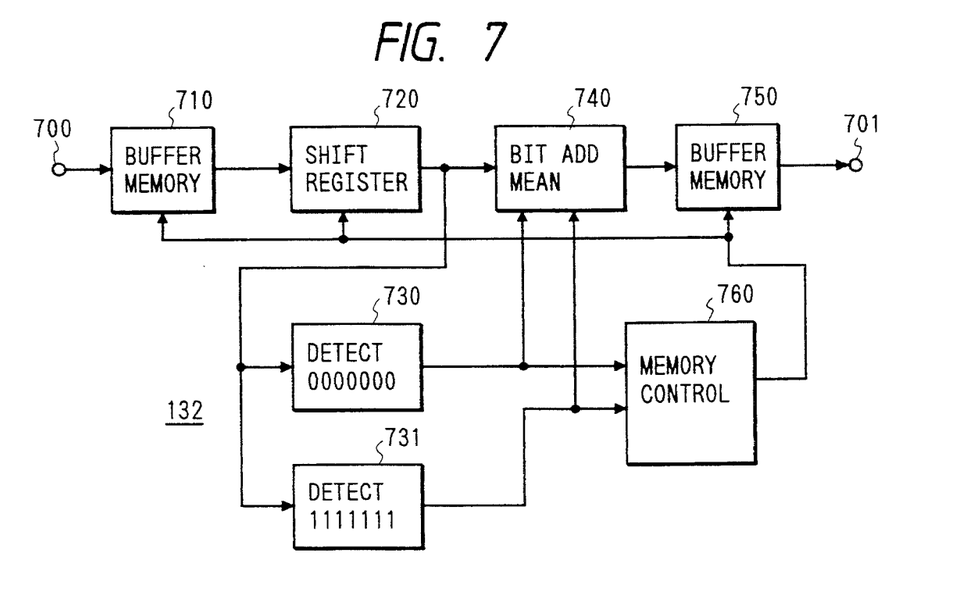
FIG. 7 is a block diagram illustrating a data transform means in the embodiment of FIG. 4.

FIG. 7 illustrates an embodiment of the circuit constitution of the data transform means 132 of FIG. 4, and wherein reference numeral 700 denotes a data input terminal of the data transform means 132, reference numeral 701 denotes a data output terminal, 710 and 750 denote buffer memories, 720 a shift register, 730 a means for detecting 0000000, 731 a means for detecting 1111111, 740 a bit add means, and 760 a memory control means.

The data input through the terminal 700 are input to the buffer memory 710, and are successively output to the shift register 720 according to the memory control means 760. Control signals are input to the shift register 720 from the memory control means 760, and the data are input to the detect means 730 and 731 from the MSB when seven bits of data are stored, and the coincidence is detected with 0000000 or 1111111. When the data are not in agreement, the data of another one bit is sent from the buffer memory 710 to the shift register 720 to obtain data of eight bits. No data is added to the eight-bit data through the bit add means 740; i.e., the eight-bit data are input to the buffer memory 750.

When 0000000 is detected at the detect means 730, a detect signal is input to the bit add means 740 so that 1 is added to the LSB. When 1111111 is detected at the detect means 731, a detect signal is input to the bit add means 740 so that a bit 0 is added to the LSB. The data of eight bits inclusive of the added data are input to the buffer memory 750.

When 0000000 or 1111111 is detected at the detect means 730, 731, a detect signal is input to the memory control circuit 760, whereby the buffer memory 710, shift register 720 and buffer memory 750 are controlled to carry out the operation same as the above-mentioned operation.

The buffer memory 750 outputs data of eight bits as a unit to the terminal 701. Thus, there are obtained as shown in FIG. 5, the transformed data from which 00(H) and FF(H) are deleted.

Figure 8:
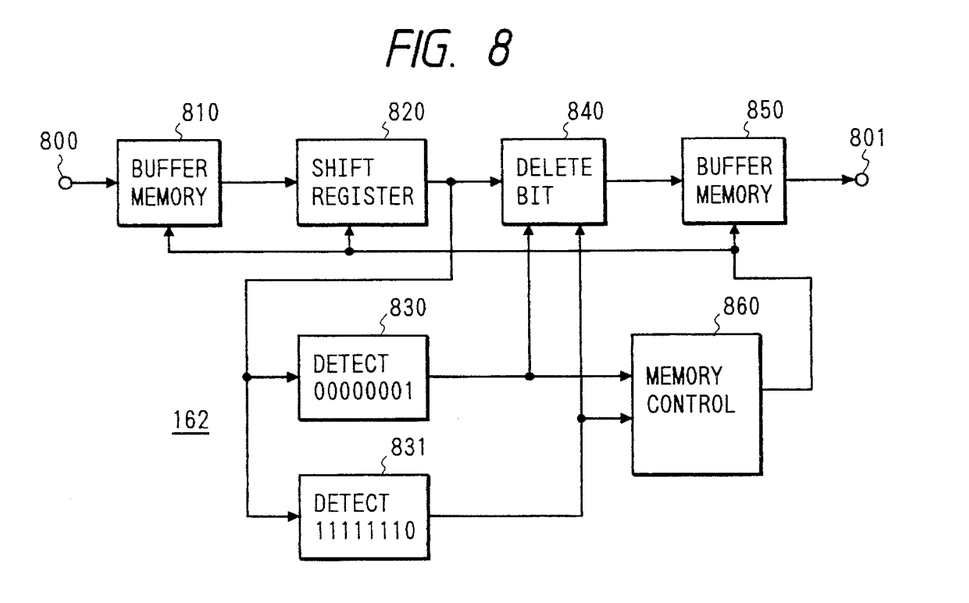
FIG. 8 is a block diagram illustrating a data reverse transform means in the embodiment of FIG. 4.

Next FIG. 8 illustrates an embodiment of the circuit constitution of the data reverse transform means 162 of FIG. 4, and wherein reference numeral 800 denotes a data input terminal of the data reverse transform means 162, reference numeral 801 denotes an output terminal of the data reverse transform means 162, reference numerals 810 and 850 denote buffer memories, 820 a shift register, 830 a 01(H) detect means, 831 an FE(H) detect means, 840 a bit delete means, and 860 denotes a memory control means.

The data input through the terminal 800 is input to the buffer memory 810. The data are input from the buffer memory 810 to the shift register 820, and are then input to the detect means 830 and 831 when eight, bits of data are stored. When 01(H) is detected at the detect means 830 and FE(H) is detected at the detect means 831, the data is input from the shift register 820 to the bit delete means 840, whereby the data of LSB is deleted and the data of seven bits are input to the buffer memory 850. When neither 01(H) nor FE(H) is detected at the detect means 830 and 831, the bit delete means 840 does not delete bit from the data of the shift register 820, and the data of eight bits are input to the buffer memory 650.

When 01(H) and FE(H) are detected at the detect means 830 and 831, the detect signals are input to the memory control means 860 which then controls the buffer memory 810, shift register 820 and buffer memory 850 in a manner as described above.

Then, continuous data are output from the buffer memory 850 to the terminal 801. Thus, the processing shown in FIG. 6 is realized, and the data in agreement with the input data of FIG. 5 are restored.

The embodiment of FIG. 8 employed the 01(H) detect weans 830 and FE(H) detect means 831. When the seven higher-order bits from the shift register 830 are all 0 or all 1, the LSB necessarily becomes 1 or 0. Therefore, there may be used the 0000000 detect means instead of the 01(H) detect means 830 and the 1111111 detect means instead of the FE(H) detect means 831.

As described above, the digital data can be efficiently transmitted and restored by deleting 00(H) and FF(H).

The present invention can be applied not only for deleting 00(H) and FF(H) but also for inhibiting the data which are greater than a predetermined level or smaller than a predetermined level. For instance, when digital image signals are input to the digital VTR 150A shown in FIG. 4, the data of smaller than a predetermined level can be handled as synchronizing signals in order to detect synchronizing signals of image signals.

Now, a VTR of the D-2 format is considered below as the digital VTR 150A. In this case, there have been determined by standards that the tip of the synchronizing signal be 04(H), the blanking level be 3C(H) and the white level be C8(H). Here, when the data of smaller than 0F(H) are consecutively input, they can be regarded to be synchronizing signals. Described below is a data transform method which does not permit the data of smaller than 0F(H) to be input consecutively by more then two times.

Figure 9:
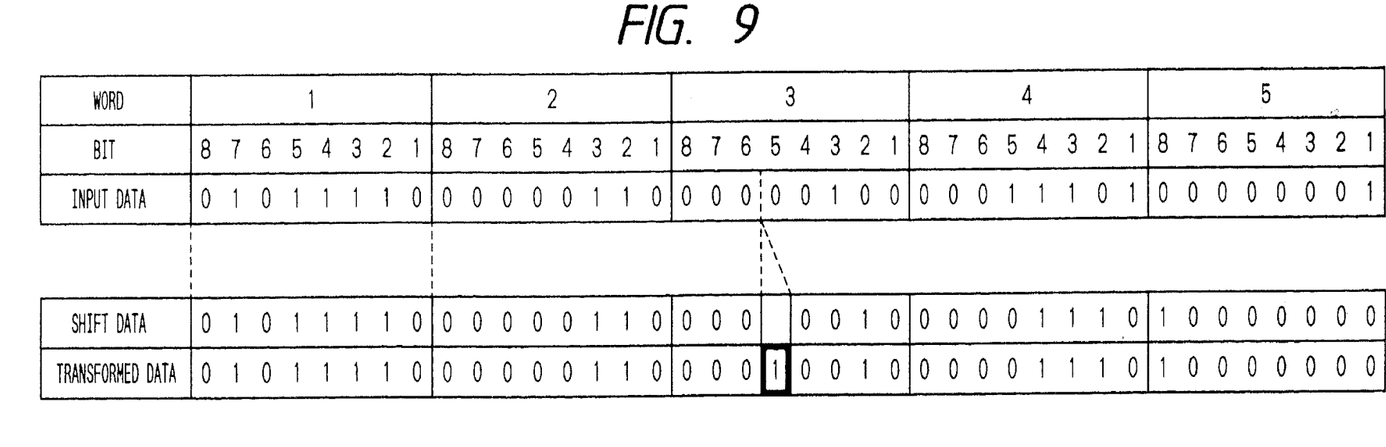
FIG. 9 is a diagram for explaining the operation of another example of the data transform method.

FIG. 9 is e diagram explaining the data transform method of this case. When the bits are checked starting from the MSB, the data is found to be greater than 0F(H) irrespective of the LSB only when it is greater than 10(H) like in the data transform method of deleting 00(H) and FF(H) shown in FIGS. 5 and 6. Therefore when the data of greater than 0F(H) are consecutively input more than two times, a date 1 is added between the third bit and the fourth bit from the MSB in the second data. This will be concretely described with reference to FIG. 9.

In FIG. 9, the seventh bit of word 1 is 1, and thus it is obvious that the data are greater than 0F(H). In the word 2, the data is smaller than 0F(H) but is directly transmitted since it is the first data. In the word 3, the three MSBs are all 0, and it is not obvious whether the data are greater than 0F(H). Therefore, the data after the fifth bit of word 3 of input data are shifted by one bit, and data 1 is added to the blank portion formed by the shift to obtain transformed data. Therefore, the transformed data after the fifth bit of input data are shifted by one bit.

Then, looking at the data of word 4 of shift data (data of from the first bit of word 3 of input data to second bit of word 4), they are 0E(H), i.e., they are smaller than 0F(H). However, since the data of word 3 have been transformed into the data of greater than 0F(H), the word 4 of shift data becomes the first data of smaller than 0F(H). The word 5 of shift data has the data 1 at the bit 8, from which it is obvious that the data are greater than 0F(H) and are directly transmitted.

As described above, when the preceding word is smaller than a predetermined value (0F(H) in the embodiment shown in FIG. 9), a data is added to such a position that the subsequent word will have data greater than the predetermined value at the MSB only irrespective of the LSB. As described above, when the subsequent word obviously has data which is 0F(H) then no data needs be added.

Figure 10:
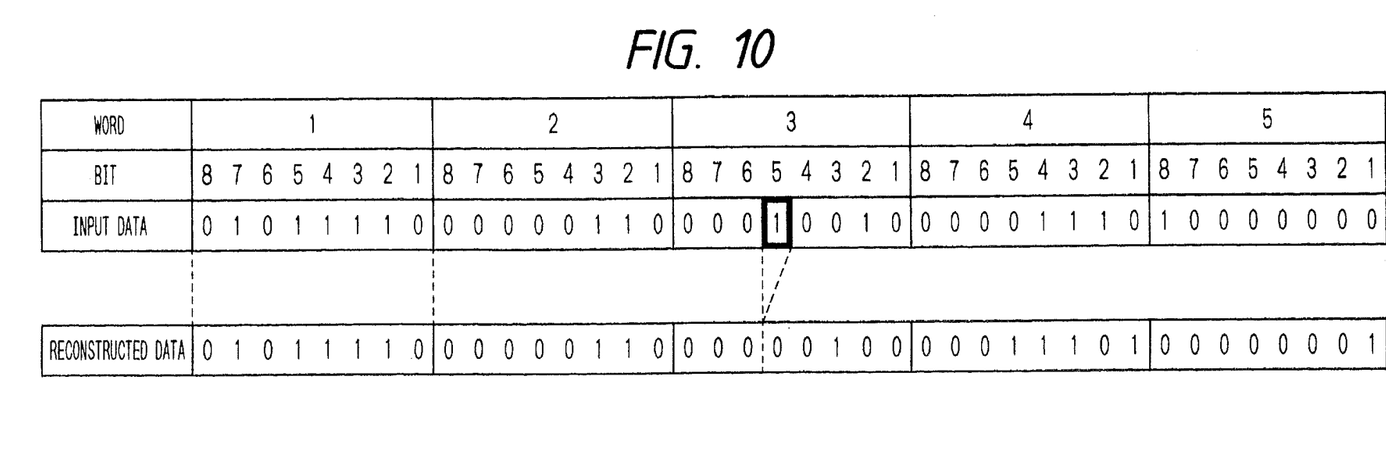
FIG. 10 is a diagram for explaining the operation of another example of the data reverse transform method.

Next, described below with reference to FIG. 10 is a method of returning back to the original data the data which are so transformed that the data of smaller than 0F(H) will not continue.

in FIG. 10, the word 1 of input data is greater than 0F(H) and is directly output as restored data. Referring next to the word 2 of input data, the data is 06(H) which is the first data that is smaller than 0F(H). Referring to the data of the word 3, the bits 8 to 6 are all 0 and it will be learned that the bit 5 is an added bit. This added data 1 is deleted, and the subsequent data are shifted forward by one bit and are output as restored data. The word 4 of input data is the data which is smaller than 0F(H) but is the first data smaller than 0F(H) since the word 3 is the data greater than 0F(H). The subsequent word 5 of input data is the data greater than 0F(H) and is directly output as restored data.

Through the above processing, the restored data of FIG. 10 become the same as the input data of FIG. 9, which means that the original data are restored. That is, the data which are smaller than a predetermined level are prevented from being consecutively generated more than a predetermined number of times, are recorded in the digital VTR and are regenerated to reconstruct the original data.

Figure 11:
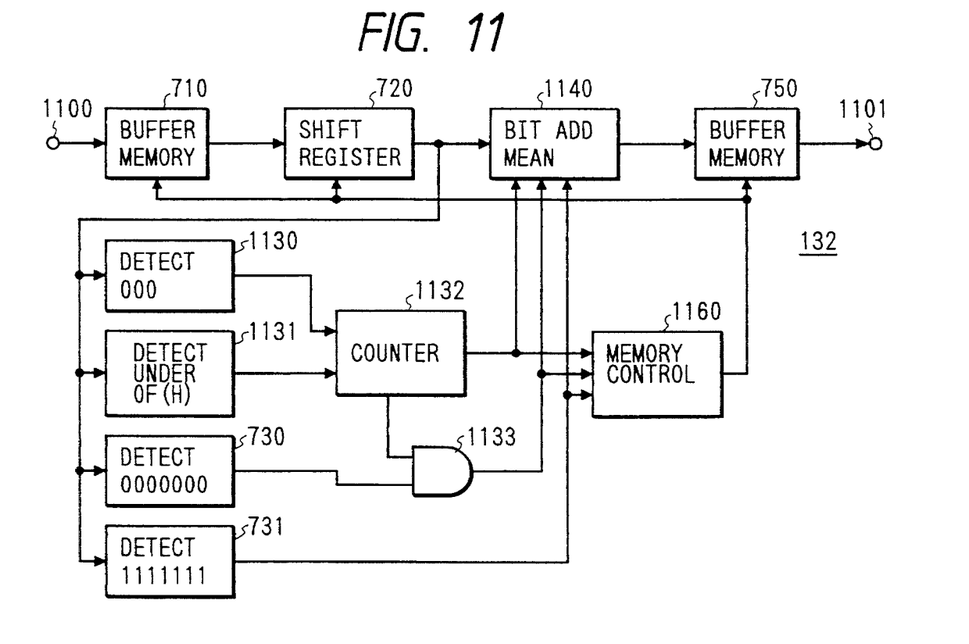
FIG. 11 is a block diagram illustrating a data transform means for realizing the data transform method of FIG. 9.

FIG. 11 illustrates the constitution of the data transform means 132 for realizing the embodiment of FIG. 9. In FIG. 11, some portions are common to those of the embodiment of FIG. 7, and the common portions are denoted by the same reference numerals and their description is not repeated.

In FIG. 11, reference numeral 1100 denotes an input terminal of the data transform means, 1101 an output terminal of the data transform means, 1130 a 000 detect means, 1131 a means for detecting the data smaller than 0F(H) 1132 a counter, 1133 an AND gate 1140 a bit add means, and reference numeral 1160 denotes a memory control means.

The data input through the terminal 1100 are fed to the buffer memory 710 which outputs data to the shift register 720 according to control signals from the memory control means 1160. The output signals of the shift register 720 are input to the 000 detect means 1130, means 1131 for detecting data smaller than 0F(H), 0000000 detect means 730, 1111111 detect means 731 and bit add means 1140. The 000 detect means 1130 detects the three MSBs which are 000 in the data output from the shift register 720, and sends a detect signal to the counter means 1132.

When the data output from the shift register 720 is smaller than 0F(H), the means 1131 for detecting data of smaller than 0F(H) outputs a detect signal to the counter means. The 0000000 detect means 730 checks seven MSBs in the data output from the shift register 720 and sends a detect signal to the AND 9ate means 1133 when the bits are 0000000. The 1111111 detect means 731 checks seven MSBs in the data output from the shift register 720 and sends a detect signal to the memory control mean 1160 and to the bit add means 1140 when the bits are 1111111. In this case, the circuit operates in the same manner as in the embodiment of FIG. 7 to prevent the occurrence of FF(H).

The counter means 1132 counts the number n (n is an integer larger than 1) of data of smaller than 0F(H) that developed consecutively. The embodiment of FIG. 9 has dealt with the case where the data smaller than 0F(H) are inhibited from developing twice consecutively. In this case, when a control signal of smaller than 0F(H) is input and then a detect signal is input from the 000 detect means 1130, the counter 1132 sends a control signal to the memory control means 1160 and to the bit add means 1140. In this case as in the embodiment shown in FIG. 6, the bit add means 1140 adds a code between the sixth bit and the fifth bit, and the data after the fifth bit are shifted.

The AND gate circuit 1133 receives a control signal from the counter circuit 1132. The control signal assumes the low level only when the control signal from the 000 detect means 1130 becomes effective and works to close the AND gate. That is, the operation of the 0000000 detect means 730 is discontinued in the portion of word 3 shown in FIG. 9, but the operation of the 0000000 detect means 730 is permitted to be effective in other cases.

Hereinafter, the operation is carried out in the same manner as in the embodiment shown in FIG. 7 to realize the operation of the embodiment of FIG. 9.

Figure 12:
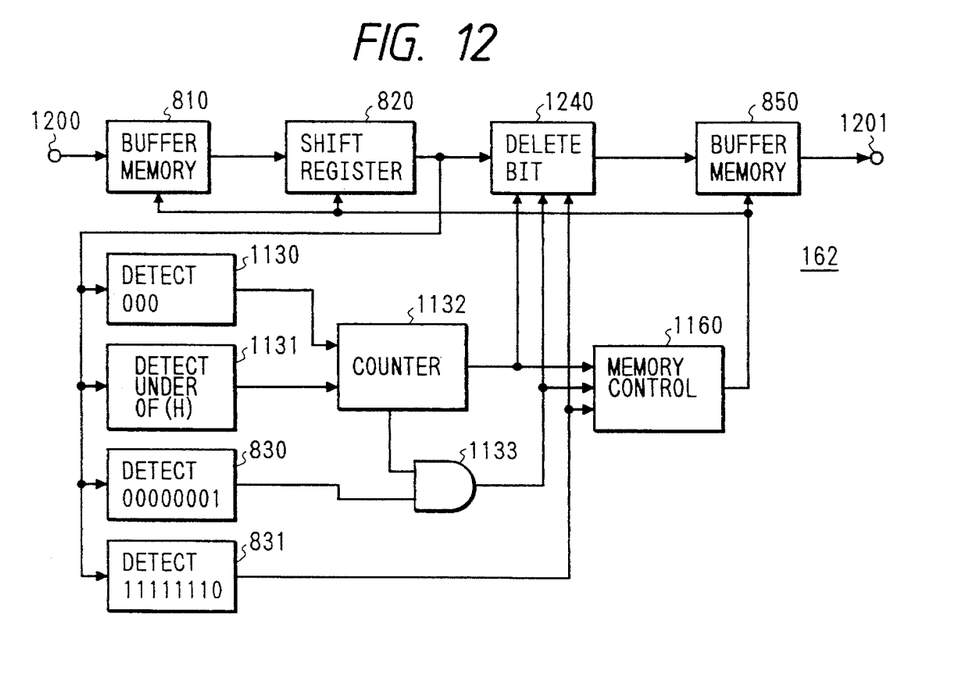
FIG. 12 is a block diagram of a data reverse transform means for realizing the data reverse transform method of FIG. 10.

FIG. 12 illustrates an embodiment of the constitution of the data reverse transform means 162 for realizing the embodiment of FIG. 10. In FIG. 12, some portions are the sane as those of the embodiment of FIG. 11 and these portions are denoted by the same reference numerals but their description is not repeated here. In FIG. 12, reference numeral 1200 denotes an input terminal of data, 1201 an output terminal of data, and 1240 denotes a bit delete means which operates in the same manner as that of the embodiment of FIG. 8 to delete the data added in the embodiments shown in FIGS. 5, 9 and 11.

As described above, 00(H) and FF(H) are deleted, so that the data smaller than a predetermined level (0F(H) in the case of this embodiment) will not develop consecutively more than a predetermined number N of times.

In the aforementioned embodiments, the data smaller than a predetermined value are inhibited from consecutively develop more than a predetermined number N of times. The embodiment, however, can be similarly realized even when the data greater than a predetermined value are to be inhibited from consecutively developing more than a predetermined number N of times.

Moreover, the data can be added not only at the positions mentioned with reference to the above embodiments in conjunction with the drawings for explaining the operation thereof but also at such positions that help avoid the inhibited rules or at such positions that enable the added data to be detected at the time of reconstruction.

Figure 13:
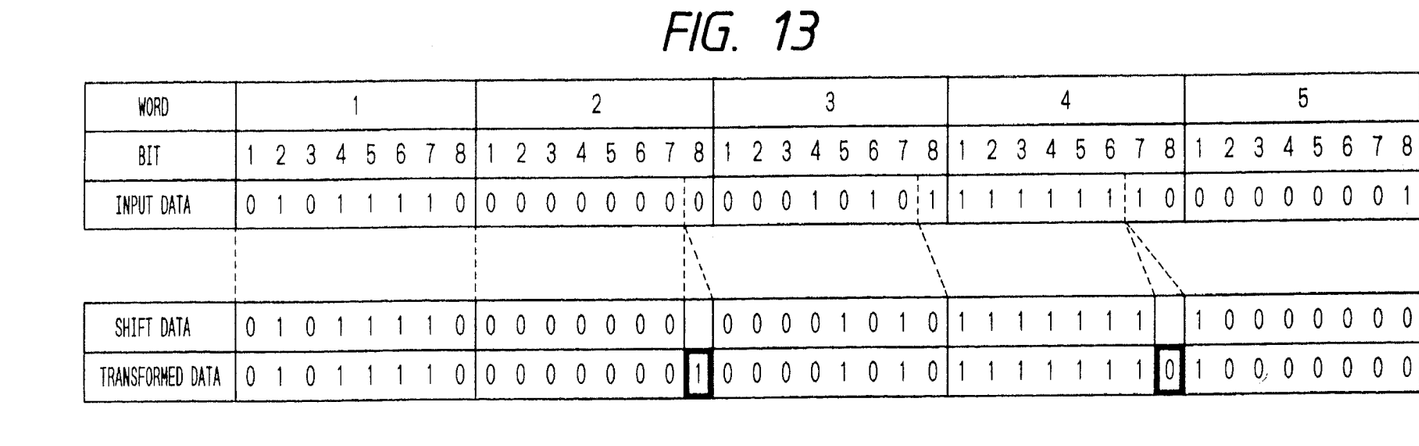
FIG. 13 is a diagram for explaining the operation of the data transform method according to another embodiment.
Figure 14:
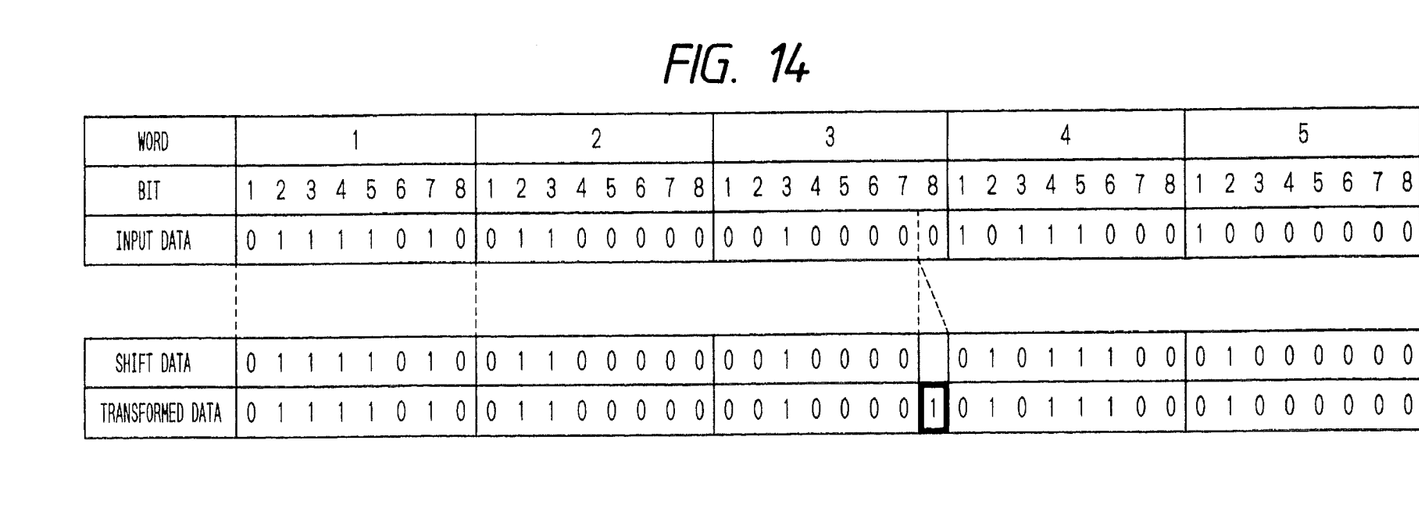
FIG. 14 is a diagram for explaining the operation of the data reverse transform method according to a further embodiment.

In the aforementioned embodiments and in the drawings explaining the operations thereof, it was described that serial data are transmitted from the record signal processing means 131 shown in FIG. 4. However, the same signal processing can be performed even when the data are transmitted in parallel. That is in FIGS. 5, 9 and 13 which explain the operation, it should be so considered that the data are input with the word as a unit. By shifting the data, the parallel data are handled with the word as a unit as represented by shift data and transformed data of FIGS. 5, 9 and 13.

According to the embodiments of the invention as described above, the digital data can be transmitted without any problem even when the data such as 00(H) and FF(H) are inhibited, even when the data smaller than a predetermined value are inhibited from consecutively appearing more than a predetermined number N of times or even when the data greater than a predetermined value are inhibited from consecutively appearing more than a predetermined number N of times. Moreover, the data increases very little as a result of the transform.

We claim:

1. An apparatus for storing high definition and low definition image signals including a signal storage medium for low definition format and having an input/output interface for the low definition image signals, comprising:

a compression means for compressing a high definition image signal of a moving image into a compressed image signal;

a format transform means for transforming the compressed image signal into an output signal having a low definition format;

an input means for inputting the output signal of said format transform means to said signal storage medium for storage in the low definition format via said input/output interface; and an output means for taking out the output signal stored in said storage medium via said input/output interface.

2. The apparatus for storing said image signal according to claim 1, wherein said input means has a low definition image signal transmit means that includes a transmission processing means, a transmission medium which consists of a coaxial line and a reception processing means, wherein said transmission processing means transforms the image signals for transmission as serial data over said coaxial line.

3. An apparatus for storing high definition and low definition image signals including a signal storage medium for storing in a low definition format and having an input/output interface for the low definition image signals, comprising:

a compression means for compressing a high definition image signal of a moving image into a compressed image signal;

a format transform means for transforming the compressed image signal into an output signal having a low definition format;

an input means for inputting the output signal of said format transform means to said signal storage medium for storage in the low definition format via said input/output interface;

an output means for taking out the output signal stored in said storage medium via said input/output interface;

a format reverse transform means which returns output signals from said output means back to said compressed image signal; and an expansion means which expands said compressed signal obtained from said format reverse transform means to the high definition image signal.

4. The apparatus for storing said image signal according to claim 3, wherein said output means has a low definition image signal transmit means that includes a transmission processing means, a transmission medium which consists of a coaxial line and a reception processing means, wherein said transmission processing means transforms the image signals for transmission as serial data over said coaxial line.

5. The apparatus for storing said image signal according to claim 4, wherein said input means has a low definition image signal transmit means that includes a transmission processing means, a transmission medium and a reception processing means.

6. The apparatus for storing said image signal according to claim 4, wherein said format transform means comprises:

a level detecting means that detects the input data within a predetermined range of levels that appear consecutively a predetermined number N ($\geq 1$) of times;

a shifting means which shifts the data succeeding a predetermined bit in said input data when the data are consecutively detected said predetermined number N of times by said level detecting means; and an adder means which adds a code to a predetermined bit produced by said shifting means.

7. An apparatus for storing high definition and low definition image signals including a signal storage medium for low definition format and having an input/output interface for the low definition image signals, comprising:.

a compression means for compressing a high definition image signal of a moving image into a compressed image signal;

a format transform means for transforming the compressed image signal into an output signal having the low definition format, wherein said format transform means comprises:

a level detecting means that detects the input data within a predetermined range of levels that appear consecutively a predetermined number N ($>1$) of times;

a shifting means which shifts the data succeeding a predetermined bit in said input data when the data are consecutively detected said predetermined number N of times by said level detecting means; and an adder means which adds a code to a predetermined bit produced by said shifting means;

an input means for inputting the output signal of said format transform means to said signal storage medium for the low definition format via said input/output interface: and an output means for taking out the output signal stored in said storage medium via said input/output interface.

8. An apparatus for storing high definition and low definition image signals including a signal storage medium for storing in a low definition format and having an input/output interface for the low definition image signals, comprising:

a compression means for compressing a high definition image signal of a moving image into a compressed image signal;

a format transform means for transforming the compressed image signal into an output signal having a low definition format;

an input means for inputting the output signal of said format transform means to said signal storage medium for the low definition format via said input/output interface;

an output means for taking out the output signal stored in said storage medium via said input/output interface;

a format reverse transform means which returns the output signals from said output means back to said compressed image signal, wherein said format reverse transform means comprises:
- a level detecting means that detects the data within a predetermined range of levels which are taken out from said output means and which appear consecutively a predetermined number N ($\geq 1$) of times;
- a delete means which deletes a predetermined bit from the signal taken out from said output means when the data within said predetermined range of levels are consecutively detected the predetermined number N of times by said level detecting means; and
- a shifting means which shifts the data succeeding said predetermined bit; and an expansion means which expands said compressed signal obtained from said format reverse transform means to the high definition image signal.

9. A method of storing an image signal using a medium for storing said image signal that has an input/output interface for a low definition image signal, comprising the steps of:

compressing a high definition image signal of moving images;

transforming said compressed high definition image signal into a format of said low definition image signal;

inputting said transformed signal into said storage medium;

taking out said transformed signal stored in said storage medium via said input/output interface and returning said signal to said compressed high definition image signal through a format reverse transform; and expanding said compressed high definition image signal to output said high definition image signal.

10. The method of storing said image signal according to claim 9, wherein said format transform of said image signal comprises:

detecting the input data within a predetermined range of levels that appear consecutively a predetermined number N ($\geq 1$) of times;

shifting the data succeeding a predetermined bit in said input data when the data are consecutively detected said predetermined number N of times; and adding a code to a predetermined bit generated as a result of said shift.

* * * * *